(12) United States Patent (10) Patent No.: US 12,668,311 B2

Mueller (45) Date of Patent: Jun. 30, 2026

(54) GLASS ROOF ASSEMBLY FOR A MOTOR VEHICLE

(71) Applicant: Dr. Ing. h.c. F. Porsche Aktiengesellschaft, Stuttgart (DE)

(72) Inventor: Marcus Mueller, Pforzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 393 days.

(21) Appl. No.: 18/237,347

(22) Filed: Aug. 23, 2023

(65) Prior Publication Data

US 2024/0140535 A1 May 2, 2024

(30) Foreign Application Priority Data

Oct. 28, 2022 (DE) ...................... 10 2022 128 731.9

(51) Int. Cl.
B62D 25/06 (2006.01)
B62D 27/02 (2006.01)
B62D 27/06 (2006.01)

(52) U.S. Cl.
CPC ........... B62D 25/06 (2013.01); B62D 27/026 (2013.01); B62D 27/065 (2013.01)

(58) Field of Classification Search
CPC .... B62D 25/06; B62D 27/026; B62D 27/065; B62D 29/04
USPC ........................................................ 296/210
See application file for complete search history.

(56) References Cited

U.S. PATENT DOCUMENTS

| | | | | |
|---|---|---|---|---|
| 5,540,478 A | * | 7/1996 | Schuch ................... | B62D 25/06 296/210 |
| 6,409,258 B1 | * | 6/2002 | Grimm ..................... | B60J 7/022 296/210 |
| 7,922,239 B2 | * | 4/2011 | Mathes ................... | B62D 25/06 296/210 |
| 11,897,545 B2 | * | 2/2024 | Zeo .......................... | B62D 25/06 296/210 |
| 2002/0093225 A1 | * | 7/2002 | Grimm .................... | B60Q 3/54 296/210 |

(Continued)

FOREIGN PATENT DOCUMENTS

| | | |
|---|---|---|
| ES | 2224977 | 3/2005 |
| WO | 2021008728 | 1/2021 |

OTHER PUBLICATIONS

English translation of WO2021008728A1; https://translationportal. epo.org; Oct. 21, 2025 (Year: 2025).*

(Continued)

*Primary Examiner* — Roger L Pang

(74) *Attorney, Agent, or Firm* — LEYDIG, VOIT & MAYER, LTD.

(57) ABSTRACT

A glass roof assembly for a motor vehicle has a glass roof (30). A fastening element (32) made of plastic is connected fixedly on an edge region of the glass roof (30), and a body structure (12) of the vehicle has a fastening flange (20) for fastening the glass roof (30). The glass roof (30) is connected fixedly to the fastening flange (20) via the fastening element (32). A reinforcing element (34) made of plastic is integrated into the fastening element (32) and extends along the fastening flange (32) in the longitudinal direction of the vehicle and/or in the transverse direction of the vehicle. The reinforcing element (34) has, at least in sections, higher strength than the fastening element (32).

13 Claims, 3 Drawing Sheets

(56)                    References Cited

U.S. PATENT DOCUMENTS

| | | |
|---|---|---|
| 2014/0300142 A1 | 10/2014 | Gneiting et al. |
| 2021/0261199 A1 | 8/2021 | Schluse et al. |
| 2023/0001774 A1 | 1/2023 | Marquart |

OTHER PUBLICATIONS

English ES2224977T3; https://translationportal.epo.org; Oct. 21, 2025 (Year: 2025).*
British Combined Search and Examination Report dated Feb. 29, 2024.

* cited by examiner

GLASS ROOF ASSEMBLY FOR A MOTOR VEHICLE

CROSS REFERENCE TO RELATED APPLICATION

This application claims priority on German Patent Application No 10 2022 128 731.9 filed Oct. 28, 2022, the entire disclosure of which is incorporated herein by reference.

BACKGROUND

Field of the Invention

The invention relates to a glass roof assembly for a motor vehicle.

Related Art

WO 2021/008728 A1 discloses a glass roof assembly that is fastened to the body structure of a motor vehicle, The body structure has a circumferential fastening flange that circumferentially bounds an opening in the roof of the body structure. The glass roof in turn has a fastening element that is configured as a circumferential foaming. The fastening element of the glass roof is fastened to the fastening flange of the body structure by an adhesive connection and by multiple screw connections. The adhesive connection is configured to be circumferential. The screw connections are spaced apart from one another and along the fastening flange. Each screw connection has an insert part embedded in the foaming, and each screw is inserted through an opening of the fastening flange and screwed into an internal thread of the insert part. The screw abuts the screw head on the fastening flange on the side opposite the glass roof.

The problem with such a design of the glass roof assembly is that the foaming has a relatively low strength and stiffness, and virtually no bracing or stabilization of the glass roof by the fastening element occurs. As a result, when the glass roof is stressed, such as when the glass roof is subjected to a local load, there is a risk of cracks forming due to the lack of stabilization of the glass roof. These cracks lead to a reduction in the stability of the glass roof and to undesirable optical changes to the glass roof.

The problem addressed by the invention is to provide a glass roof assembly with a glass roof that can be fastened reliably to the body structure without risking cracks on the glass roof.

SUMMARY OF THE INVENTION

The invention relates to a glass roof assembly for a motor vehicle. The motor vehicle has a body structure with a fastening flange, and the glass roof assembly has a fastening element configured for attaching the glass roof assembly to the fastening flange The glass roof assembly also has a reinforcing element. The reinforcing element is made of plastic and is integrated into the fastening element. The reinforcing element extends along the fastening flange in the longitudinal direction of the vehicle and/or the transverse direction of the vehicle. In some embodiments the reinforcing element extends over the entire extension of the fastening flange in the longitudinal direction of the vehicle and/or in the transverse direction of the vehicle. At least parts of the reinforcing element have higher strength than the fastening element. The reinforcing element stabilizes the glass roof in a simple and inexpensive manner and is better able to absorb local loads. Thus, stress and external loads on the glass roof are less likely to cause cracks. The fastening flange and fastening element of some embodiments are configured to be circumferential. More particularly, the fastening flange and fastening element extend in the transverse direction of the vehicle in the front and rear regions and extend in the longitudinal direction of the vehicle between the two sections extending in the transverse direction of the vehicle. The reinforcing element similarly may extend in the transverse direction of the vehicle in the front and rear regions and therebetween in the longitudinal direction of the vehicle. In other embodiments, the reinforcing element can extend solely in the longitudinal direction of the vehicle, i.e. exclusively along the body side portions.

A reinforcing element made of plastic is integrated into the fastening element of some embodiments and extends along the fastening flange in the longitudinal direction of the vehicle and/or in the transverse direction of the vehicle. The reinforcing element of some embodiments immediately abuts the fastening flange and is connected fixedly to the fastening flange. At least parts of the reinforcing element have higher strength than the fastening element. However, the vehicle also may have a roof support system that comprises bracing. The glass roof can be subjected to a particularly heavy local stress in the region of the bracing. For example, the bracing of the roof support system may have a bracing foot, and a region of the bracing foot may abut the glass roof. The glass roof can be stressed particularly heavily near the bracing foot. However, the reinforcing element of some embodiments directly abuts the fastening flange in the region of the bracing of the roof support system. The reinforcing element is strong and stiff. Thus, the force introduced into the glass roof by the roof support system can be introduced in the vertical direction of the vehicle directly into the body structure thereby preventing bending or other deformation of the glass roof. As a result, the reinforcing element prevents the bracing of the roof support system from cracking or otherwise damaging the glass roof.

The fastening element of some embodiments comprises a cover lip that covers a gap between the glass pane and the body structure. The cover lip prevents a build-up of dirt and water in the gap. The cover lip can be produced concurrently with a fastening element produced by an over-molding of the glass roof.

A fixing element of the roof support system can be inserted through the gap between the glass pane and the body structure and can be fastened on the body structure. The gap is closed by the cover lip in a dismounted state of the roof support system. In a mounted state, the fixing element, such as a tensile sheet, passes through the gap. The cover lip may have an opening for the fixing element. Alternatively, the cover lip may be flexible and elastically deforms or bends out of the way when the fixing element is introduced. Thus, the cover lip can cover the gap or cavity between the glass roof and the body structure in the dismounted state, and the roof support system can still be mounted easily on the motor vehicle.

The fastening element of some embodiments is made by over-molding the glass roof, such as with a plastic foam. The over-molding allows the fastening element to be connected to the glass roof in a simple and reliable manner. Alternatively, the fastening element may be glued to the glass roof so that the glass roof then can be fastened reliably to the body structure.

The reinforcing element may be embedded in the fastening element so that the reinforcing element can be integrated into the fastening element in a simple manner upon over-molding of the glass roof. For example, the reinforcing element may be inserted into the manufacturing tool for producing the fastening element, and the cavity for forming the fastening element then is filled with the plastic. The fastening element then is cooled with the reinforcing element embedded or encapsulated therein.

In one embodiment, the fastening element is made of polyurethane, and the reinforcing element is made of polyamide, in particular PA6.6. The polyurethane offers a high level of design freedom, is weather-resistant and temperature-resistant, and is haptically and aesthetically pleasing, so that the polyurethane is suitable for the fastening element that is visible to a person and subjected to weather. The polyamide is robust and is thus suitable for the non-visible reinforcing element.

The fastening element of some embodiments is glued and/or screwed to the fastening flange of the body structure, thereby allowing the fastening element and the glass roof connected to the fastening element to be connected easily and reliably to the body structure. The reinforcing element may comprise at least one threaded hole for screwing the fastening element to the fastening flange of the body structure. A screw then is inserted through an opening provided on the fastening flange and is screwed into the threaded hole. In one configuration, the reinforcing element comprises an insert part having an internal thread. The insert part forms the threaded hole. The fastening element then can be screwed reliably to the body structure. Forming the internal thread for screwing the screw on the reinforcing element or on the insert part integrated in the reinforcing element ensures a certain torque of the screw and provides a reliable connection between the fastening element and the body structure.

The invention also relates to an assembly of the glass roof described herein and a roof support system. The roof support system is braced on the glass roof in the mounted state, and the assembly achieves the advantages described above.

Thus, a glass roof assembly having a glass roof is provided and can be stabilized in a simple and cost-efficient manner by the fastening element and the integrated reinforcing element, so that a local load can be better absorbed, and cracks of the glass roof due to a local load can be prevented.

An embodiment of the invention is explained in further detail below with reference to the drawings.

DETAILED DESCRIPTION

Figure 1:
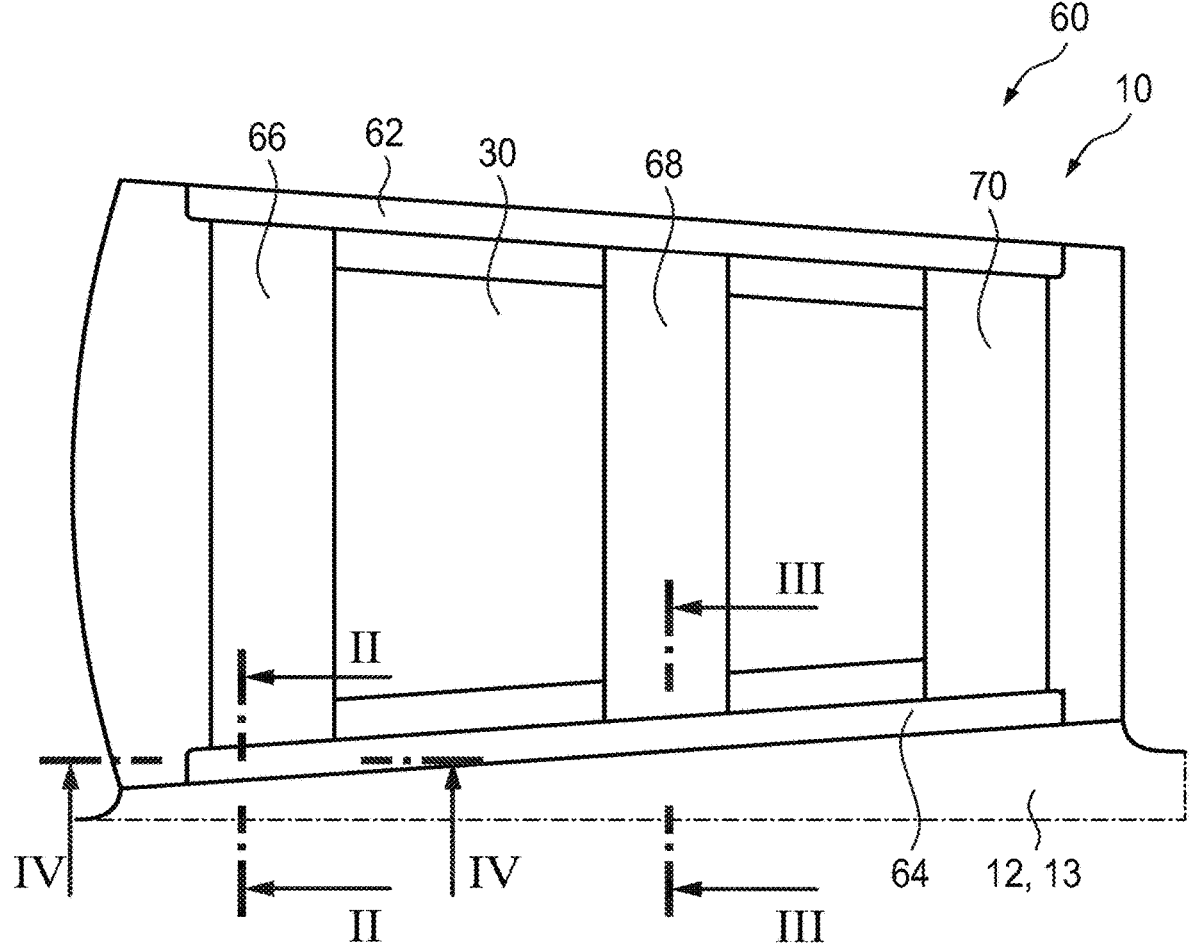
FIG. 1 is a schematic top plan view of a glass roof assembly in accordance with one embodiment.

FIG. 1 shows a glass roof assembly 10 of a motor vehicle. The glass roof assembly 10 comprises a body structure 12 and a glass roof 30. Only a side portion 13 of the body structure 12 is shown in FIG. 1. The side portion 13 is a part of a roof frame that is formed by two extending side portions extending in the longitudinal direction of the vehicle, a front portion that abuts a windscreen and extends in the transverse direction of the vehicle, and a rear portion that abuts the rear window and extends in the transverse direction of the vehicle. The glass roof 30 is connected fixedly to the body structure 12. The fastening of the glass roof 30 to the body structure 12 is shown and described by way of example using the side portion 13.

To fasten the glass roof 30, the body structure 12 or side portion 13 comprises a fastening flange 20 that extends on the side portion 13 in the longitudinal direction of the vehicle and bounds a roof opening formed by the roof frame. In addition, an edge region of the glass roof 30 is overmolded or foamed with a fastening element 32 made of a plastic, such as polyurethane. The fastening of the glass roof 30 to the body structure 12 takes place via the fastening element 32. A reinforcing element 34 made of polyamide is integrated, i.e. embedded, into the fastening element 32. The reinforcing element 34 has higher strength and stiffness than the fastening element 32. The reinforcing element 34 extends over the entire length of the fastening element 32, i.e. along the fastening flange 20, to stabilize the glass roof 30 and to absorb local loads more effectively.

Figure 2:
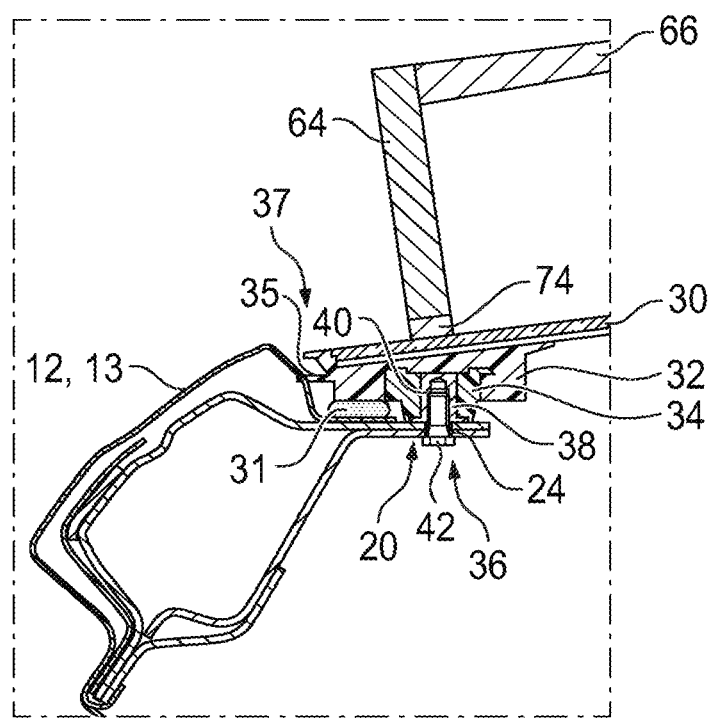
FIG. 2 is a cross-section taken along line II-II of FIG. 1.
Figure 3:
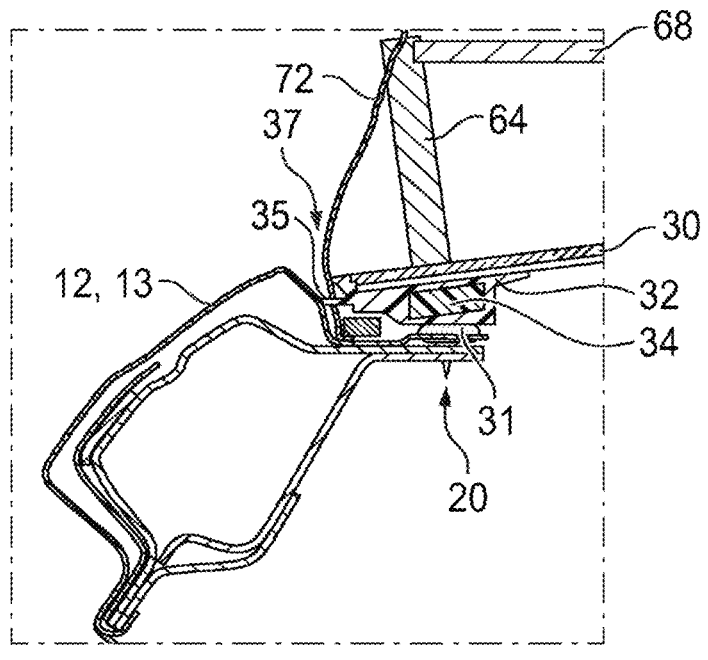
FIG. 3 is a cross-section taken along line III-III of FIG. 1.
Figure 4:
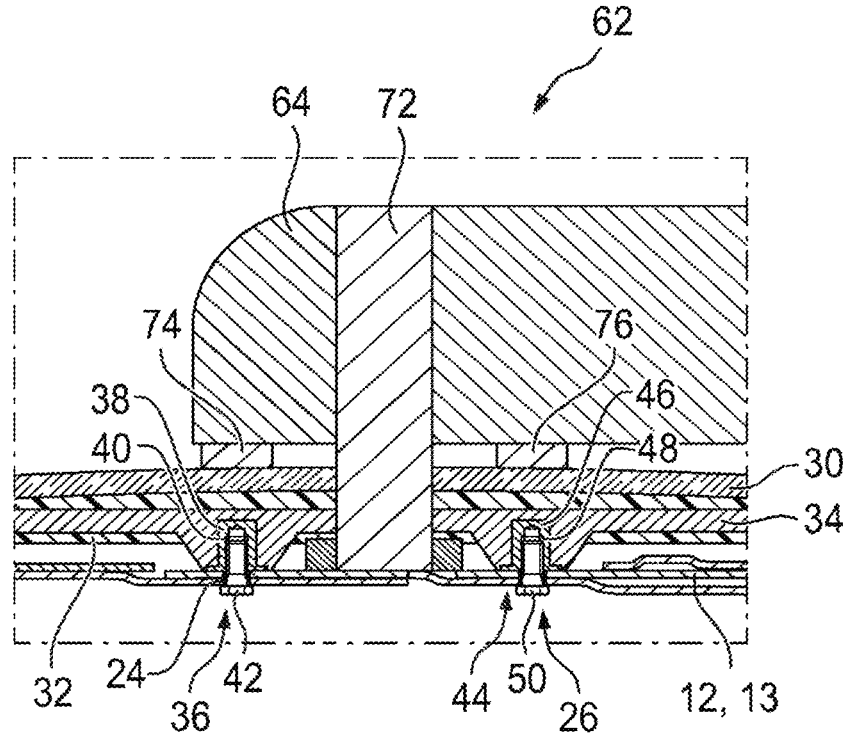
FIG. 4 is a cross-section taken along line IV-IV of FIG. 1.

Fastening of the fastening element 32 on the fastening flange 20 of the body structure 12 is carried out by an adhesive connection 31 and multiple screw connections 36, 44. Only one or two of the many screw connections 36, 44 are shown in FIGS. 2 and 4. The adhesive connection 31 may be an adhesive bead that is applied to the fastening flange 20 prior to mounting of the glass roof 30, and the fastening element 32 is placed on the adhesive bead. The screwed connections 36, 44 are formed respectively by insert portions 38, 46 and screws 42, 50. The insert portions 38, 46 are embedded in the reinforcing element 34 and each insert portion 38, 46 has an internal thread 40, 48. The screws 42, 50 are inserted respectively through openings 24, 26 on the fastening flange 32 and are screwed into the insert portions 40, 46. The reinforcing element 34 is encapsulated in the fastening element 32. A section of the reinforcing element 34 projects out from the fastening element 32 only at the regions of the screw connections 36, 44, and the protruding sections immediately abut the fastening flange 20.

The fastening element 32 comprises a cover lip 35 that projects laterally from the fastening element 32 and abuts the body structure 12 in the mounted state of the glass roof 30. The cover lip 35 is configured to cover and seal a circumferential gap 37 between the glass roof 30 or fastening element 32 and the body structure 32.

A roof support system 60 also is shown in FIGS. 1 to 4. In the mounted state, the roof support system 60 is braced on the glass roof 30 and is connected fixedly to the body structure 12 via multiple fixing elements 72. The roof support system 60 has two longitudinal beams 62, 64 and three transverse beams 66, 68, 70 extending between the two longitudinal beams 62, 64. More particularly, a first transverse beam 66 is in a front region of the glass roof 30, a second transverse beam 68 is in a center region of the glass roof 30, and a third transverse beam 70 in a rear region of the glass roof 30. The bracing of the roof support system 60 on the glass roof 30 is carried out via the longitudinal beams 62, 64. The longitudinal beams 62, 64 respectively comprise two bracing elements 74, 76 in the region of the first transverse beam 66 and in the region of the third transverse beam 70. In particular, the reinforcing element 34 immediately abuts the fastening flange 20 of the body structure 12 in this region of bracing of the bracing elements 74, 76 and is screwed thereto. This stabilizes the glass roof 30 in these regions such that sagging of the glass roof 30 is prevented, and cracks of the glass roof 30 caused sagging are avoided reliably.

The invention claimed is:

1. A glass roof assembly for a motor vehicle having a body structure that has a fastening flange, comprising a glass roof having an edge region; a fastening element made of plastic and connected fixedly to the edge region of the glass roof; and a reinforcing element made of plastic and integrated into the fastening element such that the reinforcing element, at least in sections, is fully surrounded above and below by the fastening element, the reinforcing element extending along the fastening element in a longitudinal direction of the vehicle and/or in a transverse direction of the vehicle, at least sections of the reinforcing element having a higher strength than the fastening element, wherein the glass roof is connected fixedly to the fastening flange via the fastening element.

2. The glass roof assembly of claim 1, wherein the motor vehicle further comprises a roof support system with bracing, and wherein the reinforcing element immediately abuts the fastening flange and is fixedly connected to the fastening flange adjacent the bracing of the roof support system.

3. The glass roof assembly of claim 1, wherein a gap is defined between the glass roof and the body structure, and the fastening element comprises a cover lip that covers the gap between the glass roof and the body structure.

4. The glass roof assembly of claim 3, wherein a roof support system has a fixing element that is inserted through the gap between the glass roof and the body structure and fastened on the body structure.

5. The glass roof assembly of claim 1, wherein the fastening element is produced by over-molding the glass roof.

6. The glass roof assembly of claim 1, wherein the reinforcing element is embedded in the fastening element.

7. The glass roof assembly of claim 1, wherein the fastening element is glued to the glass roof.

8. The glass roof assembly of claim 1, wherein the fastening element is made from a plastic foam.

9. An assembly having the glass roof assembly of claim 1 and a roof support system, the roof support system being braced on the glass roof.

10. The glass roof assembly of claim 1, wherein the fastening element is made from polyurethane, and the reinforcing element is made from polyamide.

11. The glass roof assembly of claim 1, the fastening element is glued to and/or screwed to the fastening flange of the body structure.

12. The glass roof assembly of claim 1, wherein the reinforcing element extends along an entire length of the fastening element.

13. A glass roof assembly for a motor vehicle having a body structure that has a fastening flange, comprising:
a glass roof having an edge region;
a fastening element made of plastic and connected fixedly to the edge region of the glass roof; and
a reinforcing element made of plastic and integrated into the fastening element, the reinforcing element extending along the fastening element in a longitudinal direction of the vehicle and/or in a transverse direction of the vehicle, at least sections of the reinforcing element having a higher strength than the fastening element, wherein the glass roof is connected fixedly to the fastening flange via the fastening element,
wherein the motor vehicle further comprises a roof support system,
wherein a gap is defined between the glass roof and the body structure, and the fastening element comprises a cover lip that covers the gap between the glass roof and the body structure, and
wherein the roof support system has a fixing element that is inserted through the gap between the glass roof and the body structure and fastened on the body structure.

* * * * *